(12) United States Patent
Umakanth et al.

(10) Patent No.: US 11,265,205 B2
(45) Date of Patent: Mar. 1, 2022

(54) SYSTEM AND METHOD FOR ANOMALY DETECTION WITH ROOT CAUSE IDENTIFICATION

(71) Applicant: Verizon Patent and Licensing Inc., Basking Ridge, NJ (US)

(72) Inventors: Adithya Umakanth, Hyderabad (IN); Balagangadhara Thilak Adiboina, Hyderabad (IN); Sumit Singh, Irving, TX (US); Pritesh Shah, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/945,152

(22) Filed: Jul. 31, 2020

(65) Prior Publication Data

US 2022/0038332 A1 Feb. 3, 2022

(51) Int. Cl.
| | | |
|---|---|---|
| *G06F 11/07* | (2006.01) | |
| *G06F 11/34* | (2006.01) | |
| *G06F 11/00* | (2006.01) | |
| *H04L 29/06* | (2006.01) | |
| *G06N 3/04* | (2006.01) | |
| *H04L 41/0631* | (2022.01) | |
| *G06N 20/00* | (2019.01) | |
| *H04L 43/16* | (2022.01) | |

(Continued)

(52) U.S. Cl.
CPC ......... *H04L 41/0636* (2013.01); *G06N 20/00* (2019.01); *H04L 41/142* (2013.01); *H04L 43/028* (2013.01); *H04L 43/08* (2013.01); *H04L 43/16* (2013.01)

(58) Field of Classification Search
CPC . H04L 41/0636; H04L 41/142; H04L 43/028; H04L 43/08; H04L 43/16; G06N 20/00
See application file for complete search history.

(56) References Cited

U.S. PATENT DOCUMENTS

| | | | |
|---|---|---|---|
| 2014/0006330 A1* | 1/2014 | Biem ................. | G06F 11/0751 706/46 |
| 2017/0034721 A1* | 2/2017 | Yang ..................... | H04W 24/08 |

(Continued)

FOREIGN PATENT DOCUMENTS

CN 111200530 A * 5/2020

*Primary Examiner* — Christopher B Robinson

(57) ABSTRACT

A computer device may include a processor configured to obtain key performance indicator (KPI) values for KPI parameters associated with at least one device and compute a set of historical statistical values for the obtained KPI values associated with the network device. The processor may be further configured to provide the KPI values and the computed set of historical statistical values to an anomaly detection model to identify potential anomalies; filter the identified potential anomalies based on a designated desirable behavior for a particular KPI parameter to identify at least one anomaly; and send an alert that includes information identifying the at least one anomaly to a management system or a repair system associated with the device. The computer device may further determine a root cause KPI parameter for the identified at least one anomaly and include information identifying the determined root cause KPI parameter in the alert.

20 Claims, 11 Drawing Sheets

(51) Int. Cl.
*H04L 43/08* (2022.01)
*H04L 43/028* (2022.01)
*H04L 41/142* (2022.01)

(56) References Cited

U.S. PATENT DOCUMENTS

| | | | |
|---|---|---|---|
| 2017/0228660 A1* | 8/2017 | Kutzkov | G06N 5/003 |
| 2018/0024875 A1* | 1/2018 | Della Corte | G06F 11/079 |
| | | | 714/37 |
| 2019/0065298 A1* | 2/2019 | Leverich | G06F 11/079 |
| 2020/0104775 A1* | 4/2020 | Chintalapati | G06F 9/451 |
| 2020/0134421 A1* | 4/2020 | Suthar | G06F 11/302 |

* cited by examiner

SYSTEM AND METHOD FOR ANOMALY DETECTION WITH ROOT CAUSE IDENTIFICATION

BACKGROUND INFORMATION

To satisfy the needs and demands of users of mobile communication devices, providers of wireless communication services continue to improve and expand available services as well as networks used to deliver such services. One aspect of such improvements includes the development of radio access networks as well as options to utilize such radio access networks. A radio access network may include a large number of devices managing a large number of connections. Managing anomalies associated with all the different devices in a radio access network may require monitoring a large number of parameters. Such monitoring may present various challenges.

DETAILED DESCRIPTION OF PREFERRED EMBODIMENTS

Figure 1:
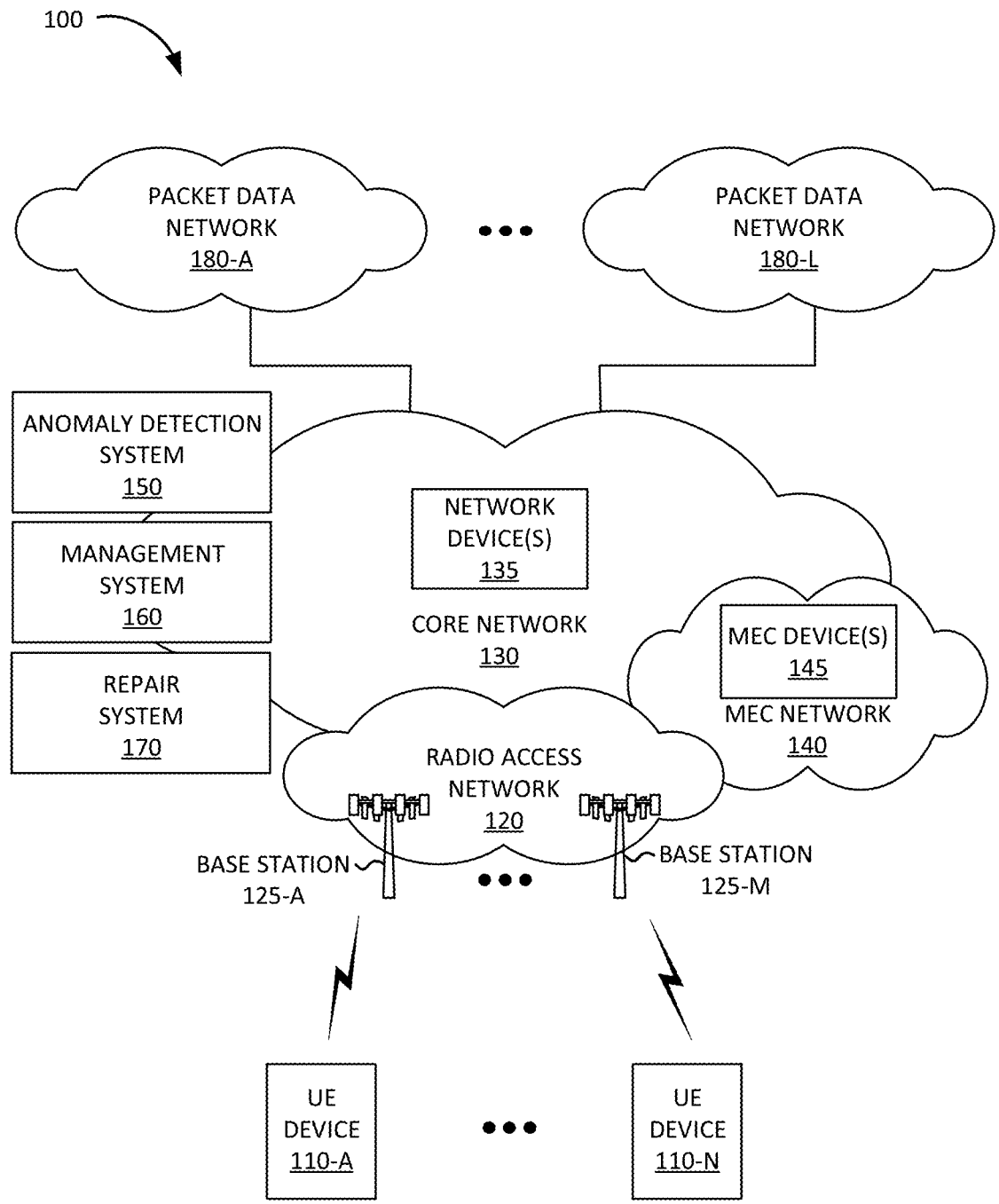
FIG. 1 illustrates an environment according to an implementation described herein.

The following detailed description refers to the accompanying drawings. The same reference numbers in different drawings identify the same or similar elements.

Network devices in a communication network may need to be monitored to ensure proper function and performance. For example, base stations in a radio access network (RAN) may need to satisfy a set of service requirements. The monitoring of network devices may include monitoring a set of key performance indicator (KPI) parameters. In order to identify an actionable event that may require a management or repair action on a network device, a monitoring system may need to detect an anomaly in data associated with a network device or a group of network devices.

Anomaly detection may include the identification of an event or data point that differs from the majority of other observed events or data points. Such an event or data point, referred to as an anomaly, may not necessarily correspond to a statistical outlier and therefore outlier detection methods may not be able to identify the event or data point as an anomaly.

Anomaly detection may play a prominent role in taking proactive measures in the maintenance of a communication network. As anomaly detection evolves, a strong need exists for predicting true anomalous events while avoiding false positives and/or negatives in situations with a large number of data points and significant noise in the data. Furthermore, identifying particular KPI parameters that played a vital role in making a data point an anomaly may be useful in correcting the situation that led to the anomaly.

Implementations described herein relate to a system and method for anomaly detection with root cause identification. The anomaly detection system may identify potential anomalies in a set of data and filter out false positives by identifying desirable behavior in KPI parameters. Furthermore, the anomaly detection system may identify a root cause KPI parameter associated with an identified anomaly.

For example, the anomaly detection system, implemented on a computer device, may obtain a set of KPI values for one or more network devices. The set of KPI values may include time series data for a set of KPI parameters for a network device, such as, for example, a base station, a network function (NF) device, a router, an optical network terminal (ONT), a WiFi Access Point (AP), a customer premises equipment (CPE) device, a reconfigurable optical add-drop multiplexer (ROADM), and/or another type of network device. Additionally, or alternatively, the set of KPI values may include values for a set of KPI parameters for a particular time period for a set of network devices (e.g., a set of base stations in an area, etc.).

The anomaly detection system may select a set of historical statistical parameters for the set of KPI parameters. For example, the anomaly detection system may compute a degree of randomness and select the set of historical statistical parameters based on the computed degree of randomness. The degree of randomness may be computed based on the number of data points, in the set of KPI values, that crossed a standard deviation value computed for the set of KPI values. If the computed degree of randomness is higher than a randomness threshold, indicating a high degree of randomness in the data, the anomaly detection system may select an interquartile range, burstiness, and/or maximum and minimum values within a time period (e.g., a 24 hour period, etc.) as the set of historical statistical parameters. If the computed degree of randomness is lower than a randomness threshold, indicating low randomness in the data, the anomaly detection system may select at least one of a mean, standard deviation, or historically observed maximum and minimum values as the set of historical statistical parameters. The randomness threshold may be dynamically adjusted by an administrator or by the anomaly detection system based on a set of threshold adjustment criteria.

The anomaly detection system may compute the selected historical statistical parameters for the set of KPI values and provide the set of KPI values and the computed historical statistical parameters to an anomaly detection model to identify potential anomalies. In some implementations, the anomaly detection model may be selected based on a data distribution uniformity value and/or a data size associated with the set of KPI values. For example, the anomaly detection system may select a distance-based anomaly detection model when the data distribution uniformity value is above the uniformity threshold and the data size is below the size threshold and select a tree-based anomaly detection model when the data distribution uniformity value is below the uniformity threshold and the data size is above the size threshold. The uniformity threshold may be dynamically adjusted by an administrator or by the anomaly detection system based on a set of threshold adjustment criteria.

A tree-based anomaly detection model may include an isolation forest model. An isolation forest model takes advantage of the fact that anomalies in a data set are easier to separate from the rest of the data points in the data set through sorting mechanism. An isolation forest algorithm recursively partitions the data set by randomly selecting a feature (e.g., a dimension of a feature vector representing a data point) and then randomly selecting a split value between the minimum and maximum values of the range of values for the attribute. The partitioning process is repeated recursively for each partition until each partition includes a single data point. The recursive partitioning process may be represented as a tree in which each node includes a splitting rule that splits a partition into two smaller partitions corresponding to the child nodes of the node, until each data point ends up in a leaf node that can no longer be split. The path length of a leaf node then corresponds to the number of partitions performed to isolate the data point associated with the leaf node. Because anomalies are easier to isolate than other data points, an anomalous data point will be associated with a shorter path length compared to other data points. If the partitioning process is repeated using different randomly selected attributes and splitting values, a set of trees (i.e., an isolation forest) is generated and the path lengths for each data point are averaged to arrive at the anomaly score for each data point. If the anomaly score for a data point is lower than a selected anomaly threshold, the data point may be designated as an anomaly. The anomaly threshold may be dynamically adjusted by an administrator or by the anomaly detection system based on a set of threshold adjustment criteria.

In some implementations, parameters for an anomaly detection model may be tuned using a grid search or a random search process to determine a combination of parameters associated with the best performance. For example, for an isolation forest model, tunable parameters may include the number of trees, the number of data records, and the number of features for each tree. A gird search may be performed to determine the best combination of these tunable parameters.

After one or more potential anomalies are identified by the anomaly detection model, the anomaly detection system may perform filtering on the identified potential anomalies to arrive at a set of one or more anomalies. As an example, the anomaly detection system may apply a significance threshold to a particular KPI parameter to remove anomalies associated with the particular KPI parameter that do not meet the significance threshold. The significance threshold may be set, and/or dynamically adjusted, by an administrator based on historical empirical performance in a domain (e.g., a radio access network) associated with the particular KPI parameter.

As another example, the anomaly detection system may filter the identified potential anomalies based on designated desirable behavior for particular KPI parameters. More specifically, the anomaly detection system may designate a desirable direction of change (e.g., increasing versus decreasing, etc.) in values for a particular KPI parameter, determine that a particular KPI value for the particular KPI parameter was classified by the anomaly detection model based on the designated desirable direction, and filter out the particular KPI value as not being an anomaly. For example, the anomaly detection system may use an isolation forest model and examine, for a data record classified as a potential anomaly, each node of a tree used by the isolation forest model to classify the data record as a potential anomaly, to determine whether all KPI values included in the data record were sorted in the desirable direction for each KPI parameter by the sorting rule of the node. If each node of the tree includes a sorting rule that sorted the data record in the desirable direction for each KPI parameter, the potential anomaly may be filtered out as being associated with desirable behavior and thus not tagged as an anomaly by the anomaly detection system.

In some implementations, the filtering mechanism may be based on KPI mean values. For example, if increasing values for a KPI parameter are designated as undesirable behavior, the anomaly detection model may examine the sorting rule at each node of the tree in an isolation forest model and determine if all the thresholds for all the KPI parameters in a data record are less than the corresponding mean value for each KPI parameter. If all the thresholds for all the KPI parameters are less than the corresponding mean values for each KPI parameter, for each node in the tree used to classify the data record as a potential anomaly, the data record may be filtered out as not being an anomaly. However, if even one KPI threshold at a node is greater than the mean value of the corresponding KPI parameter, the data record may not be filtered out and designated as an anomaly.

After potential anomalies associated with desirable behavior are filtered out, the anomaly detection system may retrain the anomaly detection model with updated prediction values that indicate that the filtered out potential anomalies are not to be labeled as anomalies. For example, an anomaly model may generate an output for each data record that may include a value of 0 if the data record is not determined to be an anomaly and a value of 1 if the data record is determined to be a potential anomaly. The value of 1 for a potential anomaly that has been filtered out may be changed to a value of 0 and the value of 1 for each potential anomaly designated as an anomaly may remain unchanged. The output value for each data record may be added as an additional feature to the data record and the anomaly model may be retrained with this additional feature added to the data records.

Additionally, the anomaly detection system may determine a root cause KPI parameter for an identified anomaly. The root cause KPI parameter may be determined using the anomaly model that has been retrained after filtering out the potential anomalies associated with desirable behavior. As an example, for a tree-based anomaly detection model, such as an isolation forest model, the anomaly detection system may calculate Shapley Additive Explanations (SHAP) values for an identified anomaly to determine the root cause KPI parameter. For a distance-based anomaly detection model, the anomaly detection system may first use a distance-based anomaly detection model as the anomaly detection model to identify an anomaly and then a tree-based anomaly detection model to identify the root cause KPI parameter using the identified anomaly as an input to the tree-based anomaly detection model. SHAP values may then be calculated for the output of the tree-based anomaly detection model. The highest SHAP value for a KPI parameter may indicate that the KPI parameter had the highest contribution to the anomaly and the KPI parameter may be selected as the root cause KPI parameter for the anomaly.

SHAP values are based on Shapley values. A Shapley value is a concept used in cooperative game theory and represents the average marginal contribution of a player in a cooperative game across all possible coalitions. Since input feature vectors may be represented as players contributing to a machine learning model output value, a Shapley value for a feature value of a feature vector corresponds to the average marginal contribution of the feature value across all possible combinations of feature values. However, computing Shapley values may be computationally expensive for feature vectors with many features and/or a large number of feature vectors. A SHAP algorithm may be used for tree-based anomaly detection models to reduce the computational complexity of computing Shapley values, by defining a value function using a conditional expectation instead of a marginal expectation.

The anomaly detection system may generate an alert that includes information relating to an identified anomaly and information identifying a determined root cause KPI parameter for the identified anomaly. The anomaly detection system may send the generated alert to a network management system and/or a network repair system associated with a network that includes the one or more network devices associated with the set of KPI values.

While implementations described herein illustrate an anomaly detection system used to detect anomalies in network devices, and base stations in particular, in other implementations, anomaly detection system may be used to detect anomalies in other types of network devices, or other types of computer devices. As an example, the anomaly detection system, as described herein, may be used to detect anomalies in CPE equipment, optical network devices (e.g., ROADMs, ONTs, etc.), circuit switching devices, routers, switches, gateway devices, Internet of Things (IoT) devices (e.g., IoT sensors, IoT controllers, etc.), autonomous vehicles, server devices, storage devices, hardware accelerators, and/or other types of network and/or computer devices.

FIG. 1 is a diagram of an exemplary environment 100 in which the systems and/or methods, described herein, may be implemented. As shown in FIG. 1, environment 100 may include UE devices 110-A to 110-N(referred to herein collectively as "UE devices 110" and individually as "UE device 110"), a radio access network (RAN) 120 that includes base stations 125-A to 125-M (referred to herein collectively as "base stations 125" and individually as "base station 125"), a core network 130 that includes network device(s) 135, a MEC network 140 that includes MEC device(s) 145, an anomaly detection system 150, a management system 160, a repair system 170, and packet data networks (PDNs) 180-A to 180-L (referred to herein collectively as "PDNs 180" and individually as "PDN 180").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications. In some implementations, UE device 110 may communicate using machine-to-machine (M2M) communication, such as MTC, and/or another type of M2M communication for IoT applications.

RAN 120 may include base stations 125 that provide cellular wireless communication services for UE devices 110. In some implementations, base station 125 may include a Fourth Generation (4G) Long Term Evolution (LTE) base station, also referred to as an eNodeB. In other implementations, base station 125 may include a Fifth Generation (5G) New Radio (NR) base station, also referred as a gNodeB. A gNodeB may incorporate various aspects of next generation networks, such as 5th generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technology.

Each base station 125 may include devices and/or components for cellular wireless communication with UE devices 110. For example, base station 125 may include a radio frequency (RF) transceiver to communicate with UE devices using a 5G NR air interface, a 4G LTE air interface, and/or using another type of cellular air interface. Base station 125 may report a set of KPI values for a set of KPI parameters to anomaly detection system 150 (and/or management system 160) at particular intervals. Alternatively, or additionally, anomaly detection system 150 (and/or management system 160) may poll base station 125 at particular intervals to collect the set of KPI values.

Core network 130 may be managed by a provider of cellular wireless communication services and may manage communication sessions of subscribers connecting to core network 130 via RAN 120. For example, core network 130 may establish an Internet Protocol (IP) connection between UE devices 110 and PDN 180. In some implementations, core network 130 may include a 5G core network. As an example, a 5G core network may provide support for enhanced Mobile Broadband (eMBB), ultra reliable low latency communication (URLLC), massive Machine Type Communication (mMTC), and/or other types of communications. In other implementations, core network 130 may include a 4G core network. Furthermore, core network 130 may include an optical communication network.

Core network 130 may include network device(s) 135 (referred to herein individually as "network device 135" and collectively as "network devices 135"). Network device 135 may report a set of KPI values for a set of KPI parameters to anomaly detection system 150 (and/or management system 160) at particular intervals. Alternatively, or additionally, anomaly detection system 150 (and/or management system 160) may poll network device 135 at particular intervals to collect the set of KPI values.

In some implementations, network device 135 may include a switch, router, firewall, gateway, a ROADM, and/or another type of network device. In other implementations, network device may include a CPE device associated with a CPE network (not shown in FIG. 1), such as an ONT, a CPE broadband router, a WiFi AP, and/or another type of CPE device.

In yet other implementations, network device 135 may include a 4G network function (NF) device, such as, for example, a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PDN gateway (PGW); a PGW that functions as a gateway to a particular PDN 180; a Policy and Charging Rules Function (PCRF) that implements policy and charging rules functions, such as establishment of Quality of Service (QoS) requirements, setting allowed bandwidth and/or data throughput limits for particular bearers, and/or other policies; and/or a Home Subscriber Server (HSS) that stores subscription information for UE devices, including subscription profiles that include authentication and access authorization information, group device memberships, subscription privileges, and/or other types of subscription information.

In yet other implementations, network device 135 may include a 5G network function (NF) device, such as, for example, an Access and Mobility Function (AMF) to perform registration management, connection management, reachability management, mobility management, and/or lawful intercepts; a Session Management Function (SMF) to perform session management, session modification, session release, IP allocation and management, Dynamic Host Configuration Protocol (DHCP) functions, and selection and control of a User Plane Function (UPF); a UPF to serve as a gateway to packet data network 160, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

MEC network 140 may include one or more MEC devices 145. MEC devices 145 may provide MEC services to UE devices 110. As an example, a MEC service may include a service associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, a virtual network function (VNF), and/or another type of network service. As yet another example, a MEC service may include control of IoT devices, such as hosting an application server for autonomous vehicles, a security system, a manufacturing and/or robotics system, and/or another type of IoT system. MEC device 145 may report a set of KPI values for a set of KPI parameters to anomaly detection system 150 (and/or management system 160) at particular intervals. Alternatively, or additionally, anomaly detection system 150 (and/or management system 160) may poll MEC device 145 at particular intervals to collect the set of KPI values.

Anomaly detection system 150 may include one or more computer devices, such as server devices, configured to implement an anomaly detection system that detects anomalies in KPI parameters for base stations 125, network devices 135, and/or MEC devices 145. Anomaly detection system 150 may detect potential anomalies, filter out potential anomalies associated with desirable behavior to identify undesirable anomalies, and/or identify one or more root cause KPI parameters for an identified anomaly. Anomaly detection system 150 may then send an alert with information relating to the identified anomaly to management system 160 and/or repair system 170.

Management system 160 may include one or more computer devices, such as server devices, configured to manage RAN 120, core network 130, and/or MEC network 140. For example, management system 160 may activate/deactivate particular base stations 125, network devices 135, and/or MEC devices 145; change a configuration associated with particular base stations 125, network devices 135, and/or MEC devices 145; instruct particular base stations 125, network devices 135, and/or MEC devices 145 to report KPI values associated with particular KPI parameters; and/or to perform other types of management actions. Management system 160 may perform a management action on a particular base station 125, network device 135, and/or MEC device 145 in response to receiving an alert from anomaly detection system 150 identifying an anomaly associated with the particular base station 125, network device 135, and/or MEC device 145.

Repair system 170 may include one or more computer devices, such as server devices, configured to dispatch a technician to a location to perform a diagnostic assessment and/or a repair on a particular base station 125, network device 135, and/or MEC device 145. Repair system 170 may dispatch the technician in response to receiving an alert from anomaly detection system 150 identifying an anomaly associated with the particular base station 125, network device 135, and/or MEC device 145.

PDNs 180-A to 180-L may each include a packet data network. A particular PDN 180 may be associated with an Access Point Name (APN) and a UE device may request a connection to the particular PDN 180 using the APN. PDN 180 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
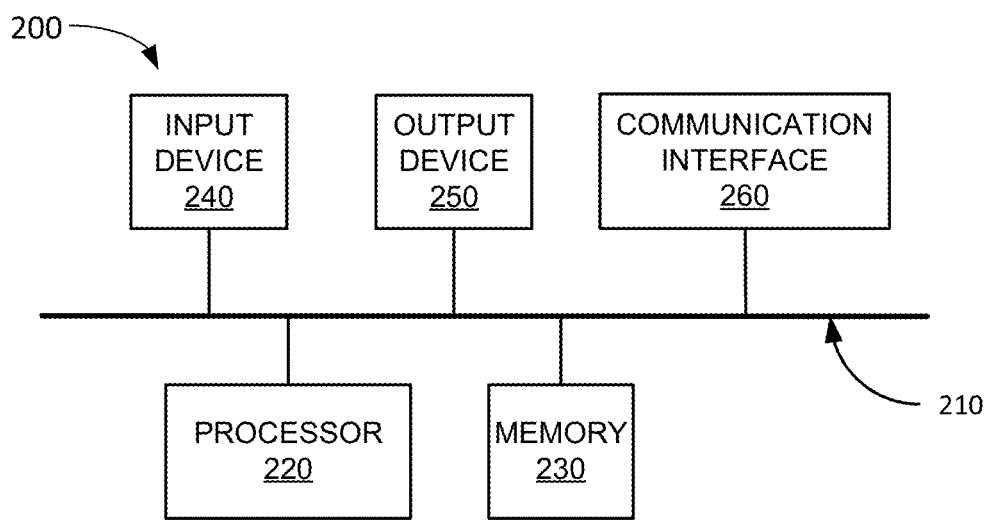
FIG. 2 illustrates exemplary components of device that may be included in the components of FIG. 1 according to an implementation described herein.

FIG. 2 is a diagram illustrating example components of a device 200 according to an implementation described herein. UE device 110, base station 125, network device 135, MEC device 145, anomaly detection system 150, management system 160, and/or repair system 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to anomaly detection. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
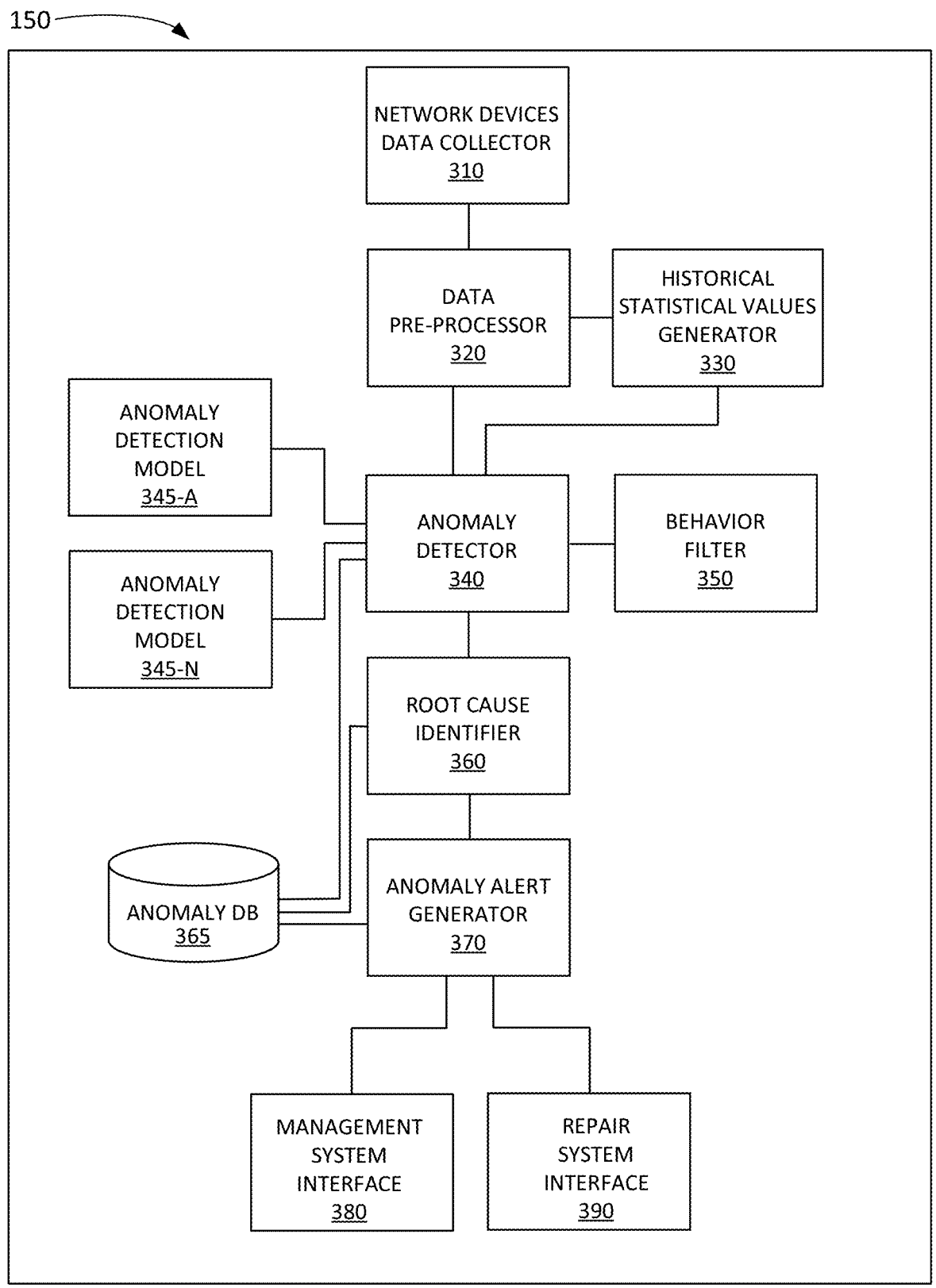
FIG. 3 illustrates exemplary components of the anomaly detection system of FIG. 1 according to an implementation described herein.

FIG. 3 illustrates exemplary components of anomaly detection system 150 according to an implementation described herein. The components of anomaly detection system 150 may be implemented, for example, via processor 220 executing instructions from memory 230. Alternatively, some or all of the components of anomaly detection system 150 may be implemented via hard-wired circuitry. As shown in FIG. 3, anomaly detection system 150 may include a network devices data collector 310, a data pre-processor 320, a historical statistical values generator 330, an anomaly detector 340, anomaly detection models 345-A to 345-N (referred to herein collectively as "anomaly detection models 345" and individually as "anomaly detection model 345"), a behavior filter 350, a root cause identifier 360, an anomaly alert generator 370, an anomaly database (DB) 365, a management system interface 380, and a repair system interface 390.

Network devices data collector 310 may collect KPI values for a set of KPI parameters. As an example, network devices data collector 310 may receive KPI data from management system 160 at particular intervals. As another example, network devices data collector 310 may receive data directly from network devices. As yet another example, network devices data collector 310 may poll the network devices for the KPI data at particular intervals. In some implementations, the KPI data may be collected from base stations 125. In other implementations, the KPI data may be collected from network devices 135. In yet other implementations, the KPI data may be collected from MEC devices 145.

The set of KPI values may include time series data for a set of KPI parameters for a network device, such as, for example, a particular base station 125, network device 135, or MEC device 145. Additionally, or alternatively, the set of KPI values may include values for a set of KPI parameters for a particular time period for a set of network devices, such as, for example, the sectors (e.g., different transceivers) of base station 125, different base stations 125 in a geographic area, different base stations 125 of a particular type (e.g., eNodeBs, gNodeBs, macrocells, femtocells, etc.), different base stations 125 associated with a particular service requirement, etc.

Data pre-processor 320 may perform pre-processing on the collected KPI data. For example, data pre-processor 320 may extract KPI values from the received KPI data and may tabulate, delimit, and/or otherwise prepare the extracted KPI values into input vectors for an anomaly detection model. In some implementations, data pre-processor 320 may perform additional processing on the prepared input vectors. As an example, data pre-processor 320 may apply a set of weights to particular KPI parameters based on weights selected by a subject matter expert (SME) or administrator associated with RAN 120, core network 130, and/or MEC network 140.

Historical statistical values generator 330 may generate one or more historical statistical values for a set of KPI values. A set of historical statistical values for a set of KPI values may be selected based on a degree of randomness associated with the set of KPI values. The degree of randomness may be computed based on the number of data points, in the set of KPI values, that crossed a standard deviation value computed for the set of KPI values. If the computed degree of randomness is higher than a randomness threshold, indicating high randomness in the data, anomaly detection system 150 may select at least one of an interquartile range, burstiness, and/or maximum and minimum values within a time period as the set of historical statistical parameters. If the computed degree of randomness is lower than a randomness threshold, indicating low randomness in the data, anomaly detection system 150 may select at least one of a mean, standard deviation, or historically observed maximum and minimum values as the set of historical statistical parameters. The randomness threshold may be dynamically adjustable based on a selected set of threshold adjustment criteria.

Anomaly detector 340 may select an anomaly detection model 345 and provide a set of KPI values along with the computed statistical historical values for the set of KPI values as inputs into the selected anomaly detection model 345. The selected anomaly detection model 345 may output one or more identified potential anomalies. In some implementations, anomaly detector 340 may select an anomaly detection model 345 based on a data distribution uniformity value and/or a data size associated with the set of KPI values. For example, anomaly detector 340 may select a distance-based anomaly detection model 345 when the data distribution uniformity value is above the uniformity threshold and the data size is below the size threshold and select a tree-based anomaly detection model 345 when the data distribution uniformity value is below the uniformity threshold and the data size is above the size threshold. The uniformity threshold may be dynamically adjustable based on a selected set of threshold adjustment criteria. In some implementations, anomaly detector 340 may tune the parameters of anomaly detection model 345 to improve performance. For example, for an isolation forest anomaly model, anomaly detector 340 may use a grid search process to tune the number of trees, the number of data records, and/or the number of features for each tree.

Each anomaly detection model 345 may correspond to a different anomaly detection model. As an example, anomaly detection model 345 may include a distance-based model, such as an index-based anomaly detection models, nested-loop based anomaly detection models, grid-based anomaly detection models, outlier scoring based anomaly detection models using a K Nearest Neighbors (KNN) algorithm, resolution-based outlier factor anomaly detection models, and/or other types of anomaly detection models. As another example, anomaly detection model 345 may include a tree-based anomaly detection model, such as an isolation forest anomaly detection model.

Behavior filter 350 may filter out potential anomalies based on one or more criteria. The remaining potential anomalies may then be designated as anomalies. As an example, behavior filter 350 may apply a significance threshold to a particular KPI parameter to remove anomalies associated with the particular KPI parameter that do not meet the significance threshold. The significance threshold may be updated at particular intervals by an administrator based on historical data associated with the particular KPI parameter in a particular network or another type of domain. As another example, behavior filter 350 may filter out potential anomalies based on designated desirable behavior for particular KPI parameters. Behavior filter 350 may designate a desirable direction of change in values for a particular KPI parameter, determine that a particular KPI value for the particular KPI parameter was classified by the anomaly detection model based on the designated desirable direction, and filtering the particular KPI value out as not being an anomaly.

For example, behavior filter 350 may use an isolation forest model and examine, for a data record classified as a potential anomaly, each node of a tree used by the isolation forest model to classify the data record as a potential anomaly, to determine whether all KPI values included in the data record were sorted in the desirable direction for each KPI parameter by the sorting rule of the node. If each node of the tree includes a sorting rule that sorted the data record in the desirable direction for each KPI parameter, the potential anomaly may be filtered out as being associated with desirable behavior and thus not tagged as an anomaly by the anomaly detection system. As another example, the filtering mechanism may be based on KPI mean values. For example, if increasing values for a KPI parameter are designated as undesirable behavior, behavior filter 350 may examine the sorting rule at each node of the tree in an isolation forest model and determine if all the thresholds for all the KPI parameters in a data record are less than the corresponding mean value for each KPI parameter. If all the thresholds for all the KPI parameters are less than the corresponding mean values for each KPI parameter, for each node in the tree used to classify the data record as a potential anomaly, the data record may be filtered out as not being an anomaly. However, if even one KPI threshold at a node is greater than the mean value of the corresponding KPI parameter, the data record may not be filtered out and designated as an anomaly.

Anomaly detector 340 may retrain anomaly detection model 345 after behavior filter 350 filters out potential anomalies associated with desirable behavior. For example, anomaly detector 340 may add a feature to each data record indicating whether the data record has been designated as an anomaly. Potential anomalies filtered out as being associated with desirable behavior may be designated as not being anomalies (e.g., feature set to a value of 0) and anomalies associated with undesirable behavior may be designated as anomalies (e.g., feature set to a value of 1). The retrained anomaly detection model 345 may be provided to root cause identifier 360.

Root cause identifier 360 may identify a root cause KPI parameter by computing SHAP values for an identified anomaly. If the selected anomaly detection model 345 corresponds to a tree-based model, root cause identifier 360 may compute SHAP values using the generated trees from the tree-based model. If the selected anomaly detection model 345 corresponds to a distance-based model, root cause identifier 360 may select a tree-based anomaly detection model 345 and use any identified anomalies from the distance-based anomaly detection model 345 as additional inputs into the tree-based anomaly detection model 345 along with the set of KPI values. The tree-based anomaly detection model 345 may then easily identify the anomalies while generating the trees used by a SHAP tree algorithm to compute SHAP values. A set of the N highest SHAP values may then be used to identify N root cause KPI parameters for the identified anomaly.

Anomaly DB 365 may store information relating to identified anomalies. Exemplary information that may be stored in anomaly DB 365 is described below with reference to FIG. 4. Anomaly alert generator 370 may generate an alert based on information stored in anomaly DB 365. For example, anomaly alert generator 370 may generate a message that includes information identifying an anomaly, a type of anomaly, one or more identified root cause KPIs, and/or other types of information associated with the identified anomaly and may provide the generated alert to management system interface 380 and/or repair system interface 390.

Management system interface 380 may be configured to communicate with management system 160. For example, management system interface 380 may send anomaly alerts to management system 160 based on an alert generated by anomaly alert generator 370. Repair system interface 390 may be configured to communicate with repair system 170. For example, repair system interface 390 may send anomaly alerts to repair system 170 based on an alert generated by anomaly alert generator 370.

Although FIG. 3 shows exemplary components of anomaly detection system 150, in other implementations, anomaly detection system 150 may include fewer components, different components, additional components, or differently arranged components than depicted in FIG. 3. Additionally, or alternatively, one or more components of anomaly detection system 150 may perform one or more tasks described as being performed by one or more other components of anomaly detection system 150.

Figure 4:
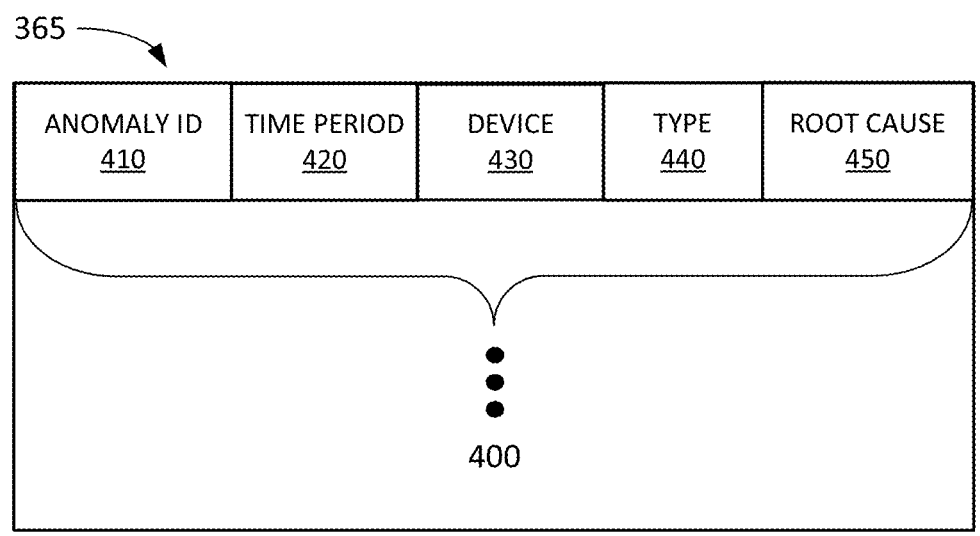
FIG. 4 illustrates exemplary components of the anomaly database of FIG. 3 according to an implementation described herein.

FIG. 4 illustrates exemplary components of anomaly DB 365 according to an implementation described herein. As shown in FIG. 4, anomaly DB 365 may include one or more anomaly records 400. Each anomaly record 400 may store information associated with an identified anomaly. Anomaly record 400 may include an anomaly identifier (ID) field 410, a time period field 420, a device field 430, a type field 440, and a root cause field 450.

Anomaly ID field 410 may include an ID that uniquely identifies an identified anomaly. Time period field 420 may identify a time period associated with the identified anomaly, such as a timestamp for when the anomaly occurred and/or a timestamp for when the anomaly was identified. Device field 430 may identify a device associated with the identified anomaly. For example, device field 430 may identify a particular base station 125, a sector/transceiver associated with a particular base station 125, an IP address and/or another type of address associated with network device 135 or MEC device 145, an instance ID associated with a network function instance running on network device 135 or MEC device 145, and/or other types of information identifying a device associated with the identified anomaly.

Type field 440 may identify a type associated with the identified anomaly. As an example, type field 440 may identify whether the anomaly corresponds to an extreme value anomaly associated with a single KPI parameter, a shift from a first range in a KPI parameter to a second range of the KPI parameter, a multivariate anomaly associated with multiple KPI parameters, a categorical anomaly associated with a rare class, and/or another anomaly classification. As another example, type field 440 may identify whether the identified anomaly is a recurring anomaly or whether the anomaly has not occurred before in connection with the associated device. As yet another example, type field 440 may include a priority, a severity, and/or an importance score assigned to the identified anomaly.

Root cause field 450 may include information identifying one or more root cause KPI parameters determined for the identified anomaly. The information may identify each root cause KPI parameter as well as a score (e.g., a SHAP value) indicating how much the root cause KPI parameter contributed to the identified anomaly.

Although FIG. 4 shows exemplary components of anomaly DB 365, in other implementations, anomaly DB 365 may include fewer components, different components, additional components, or differently arranged components than depicted in FIG. 4.

Figure 5:
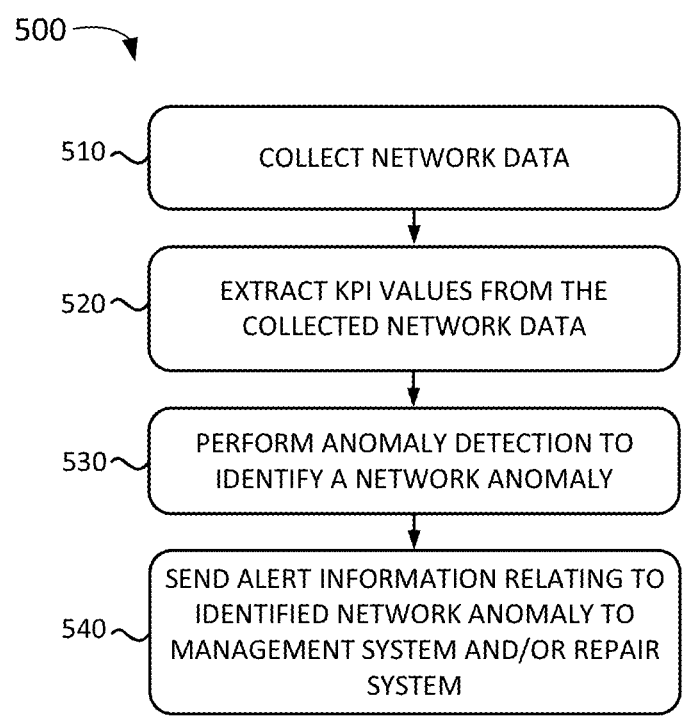
FIG. 5 illustrates a flowchart of a process for generating an alert relating to an anomaly according to an implementation described herein.

FIG. 5 illustrates a flowchart of a process 500 for generating an alert relating to an anomaly according to an implementation described herein. In some implementations, process 500 of FIG. 5 may be performed by anomaly detection system 150. In other implementations, some or all of process 500 may be performed by another device or a group of devices separate from anomaly detection system 150.

As shown in FIG. 5, process 500 may include collecting network data (block 510) and extracting KPI values from the collected network data (block 520). As an example, particular base stations 125 may report a set of KPI values for a set of KPI parameters at particular intervals to management system 160, which may forward the set of KPI values to anomaly detection system 150. Alternatively, the set of KPI values may be sent directly to anomaly detection system 150. Anomaly detection system 150 may extract KPI values from the obtained data and prepare the extracted KPI values for anomaly detection.

The KPI parameters may include accessibility KPIs (e.g., a Radio Resource Control (RRC) setup failure rate, a Radio Access Bearer (RAB) failure rate, attachment failure rate, a call setup failure rate, etc.), retainability KPIs (e.g., a radio connection drop rate, a call drop rate, a context drop rate, etc.), mobility KPIs (e.g., a handover success rate, etc.), throughput KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), transport KPIs (e.g., packet loss, packet delay, load capacity, request count, request duration, request size, response size, number of Transmission Control Protocol (TCP) bytes sent and/or received, the number of TCP connections opened and/or closed), and/or other types of network KPIs.

Anomaly detection may be performed to identify a network anomaly (block 530). An exemplary anomaly detection process is described below with reference to FIG. 6. Information relating to the identified anomaly may be sent to a management system and/or a repair system (block 540). For example, anomaly detection system 150 may generate an alert that includes information relating to identifying an anomaly, including information identifying one or more root cause KPI parameters associated with identified anomaly. Anomaly detection system 150 may then send the alert to management system 160 and/or to repair system 170.

Figure 6:
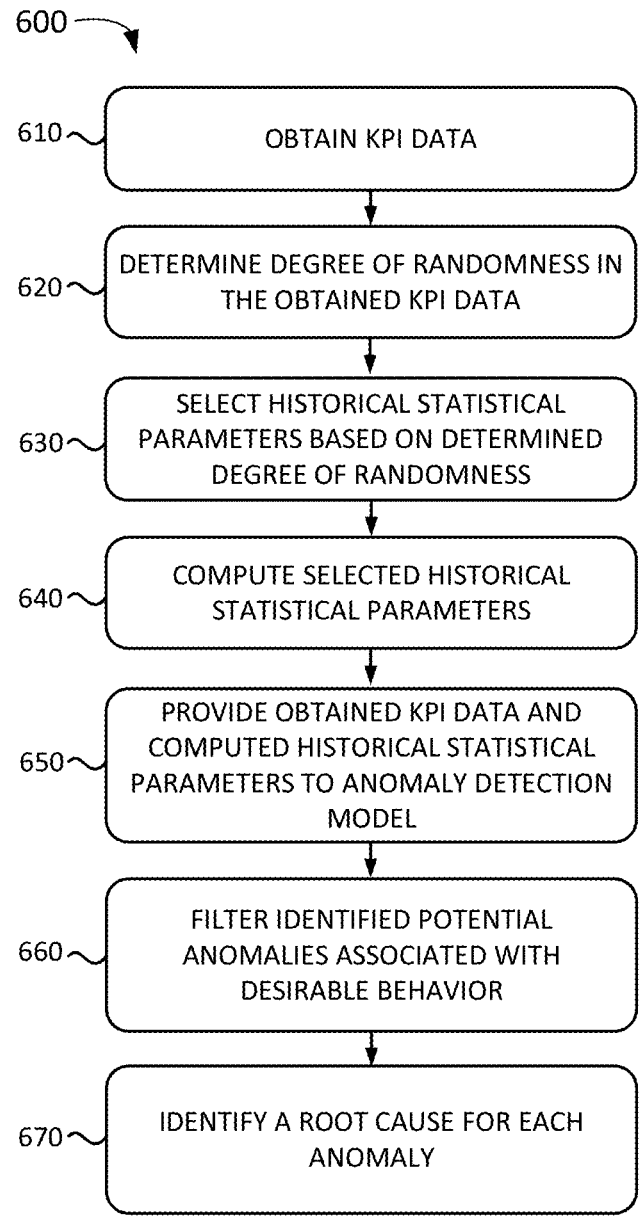
FIG. 6 illustrates a flowchart of a process for anomaly detection according to an implementation described herein.

FIG. 6 illustrates a flowchart of a process 600 for anomaly detection according to an implementation described herein. In some implementations, process 600 of FIG. 6 may be performed by anomaly detection system 150. In other implementations, some or all of process 600 may be performed by another device or a group of devices separate from anomaly detection system 150.

As shown in FIG. 6, process 600 may include obtaining KPI data (block 610) and determining a degree of randomness in the obtained KPI data (block 620) and selecting historical statistical parameters based on the determined degree of randomness (block 630). An exemplary process for selecting historical statistical values based on a degree of randomness is described below with reference to FIG. 7. Process 600 may further include computing the selected historical statistical parameters (block 640) and providing the obtained KPI data and the computed historical statistical parameters to an anomaly detection model (block 650). For example, anomaly detection system 150 may select a particular anomaly detection model 345 and may provide a set of KPI values along with the computed statistical historical values for the set of KPI values as inputs into the selected anomaly detection model 345. The selected anomaly detection model 345 may output one or more identified potential anomalies.

Process 600 may further include filtering identified potential anomalies associated with desirable behavior (block 660). For example, anomaly detection system 150 may filter out potential anomalies based on designated desirable behavior for particular KPI parameters. Anomaly detection system 150 may designate a desirable direction of change in values for a particular KPI parameter, determine that a particular KPI value for the particular KPI parameter was classified by the anomaly detection model based on the designated desirable direction, and filtering the particular KPI value out as not being an anomaly because the particular KPI value is associated with the desirable behavior.

Process 600 may further include identifying a root cause for each anomaly (block 670). For example, anomaly detection system 150 may identify a root cause KPI parameter by computing SHAP values for an identified anomaly. If the selected anomaly detection model 345 corresponds to a tree-based model, anomaly detection system 150 may compute SHAP values using the generated trees from the tree-based model. If the selected anomaly detection model 345 corresponds to a distance-based model, anomaly detection system 150 may select a tree-based anomaly detection model 345 and use any identified anomalies from the distance-based anomaly detection model 345 as additional inputs into the tree-based anomaly detection model 345 along with the set of KPI values. The tree-based anomaly detection model 345 may then easily identify the anomalies while generating the trees used by a SHAP tree algorithm to compute SHAP values. A set of the N highest SHAP values may then be used to identify N root cause KPI parameters for the identified anomaly.

Figure 7:
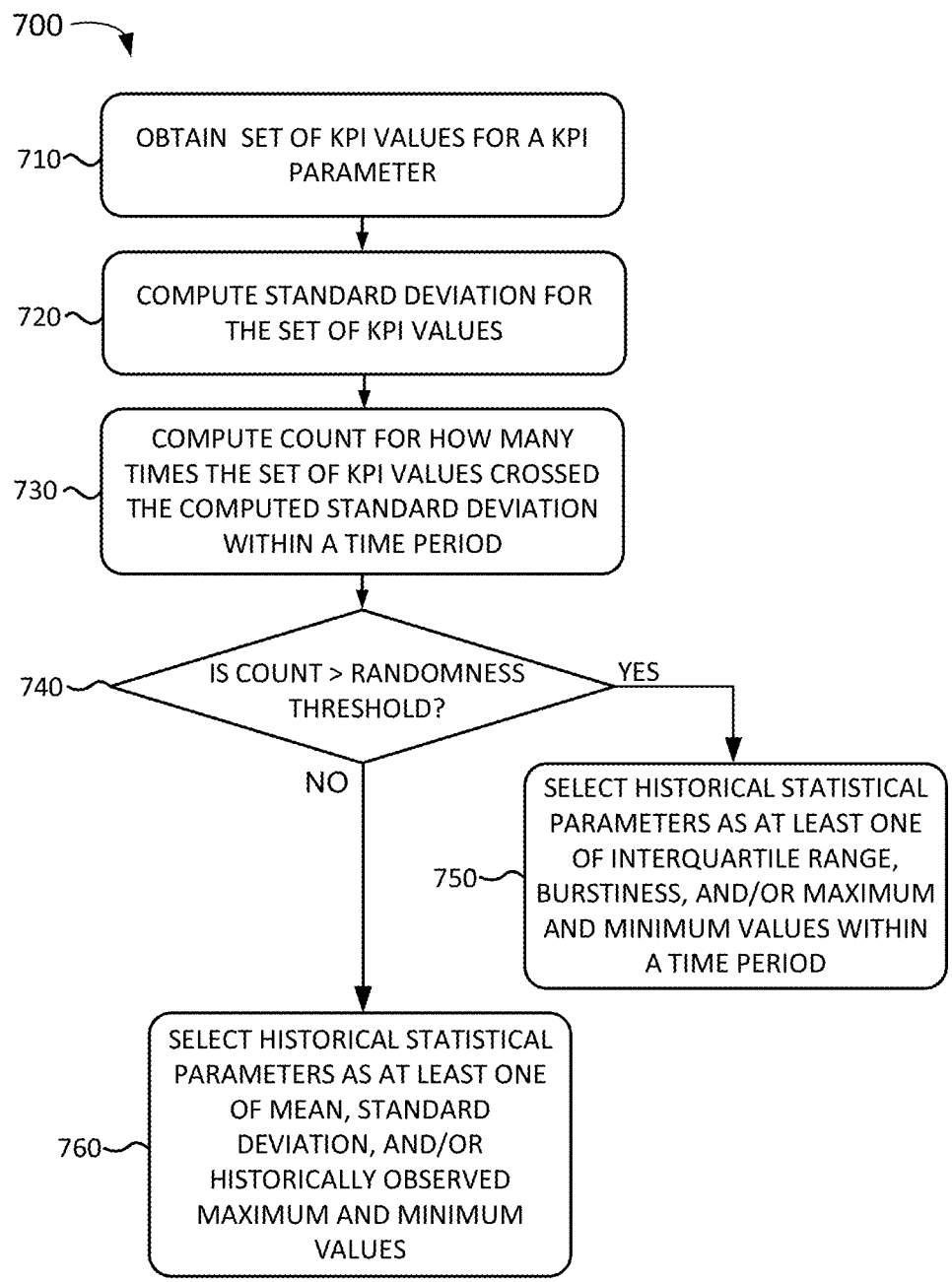
FIG. 7 illustrates a flowchart of a process for selecting historical statistical values based on a measure of randomness according to an implementation described herein.

FIG. 7 illustrates a flowchart of a process 700 for selecting historical statistical values based on a measure of randomness according to an implementation described herein. In some implementations, process 700 of FIG. 7 may be performed by anomaly detection system 150. In other implementations, some or all of process 700 may be performed by another device or a group of devices separate from anomaly detection system 150.

As shown in FIG. 7, process 700 may include obtaining a set of KPI values for a KPI parameter (block 710), computing a standard deviation for the set of KPI values (block 720), and computing a count for how many times the set of KPI values crossed the computed standard deviation within a time period (block 730). For example, anomaly detection system 150 may select a subset of the KPI values, such as N days of data, with N being configurable as a parameter by anomaly detection system 150 and determine the mean and standard deviation for the selected subset of KPI values. Anomaly detection system 150 may then determine the a count of the number of times points in the selected subset of KPI values were higher than the computed mean plus Y times the computed standard deviation or were lower than the computed mean minus Y times the computed standard deviation, with Y being configurable as a parameter by anomaly detection system 150.

A determination may be made as to whether the count is greater than a randomness threshold (block 740). For example, anomaly detection system 150 may determine whether the count is greater than X, with X being configurable as a parameter by anomaly detection system 150. If it is determined that the count is greater than the randomness threshold (block 740—YES), a set of historical statistical parameters may be selected as at least one of interquartile range, burstiness, and/or maximum and minimum values within a time period. As an example, anomaly detection system 150 may compute the interquartile range, also referred to as the middle 50% spread and defined as the difference between the value at the 75% of the distribution of values and the value at the 25% of the distribution of values. As another example, anomaly detection system 150 may compute a burstiness value for the set of KPI values, such as the Fano count defined as the ratio between the variance and the mean. As yet another example, anomaly detection system 150 may select the maximum or minimum values within each time period of length L, with L being configurable as a parameter by anomaly detection system 150. If the set of KPI values is increasing in the most recently obtained data, the maximum value may be selected and if the set of KPI values is decreasing in the most recently obtained data, the minimum value may be selected.

If it is determined that the count is not greater than the randomness threshold (block 740—NO), a set of historical statistical parameters may be selected as at least one of the mean, standard deviation, and/or historically observed maximum or minimum values for the KPI parameter may be selected. If the set of KPI values is increasing in the most recently obtained data, the historical maximum value may be selected and if the set of KPI values is decreasing in the most recently obtained data, the historical minimum value may be selected. The determined historical statistical values may be used as an input into an anomaly detection model used by anomaly detection system 150.

Figure 8A:
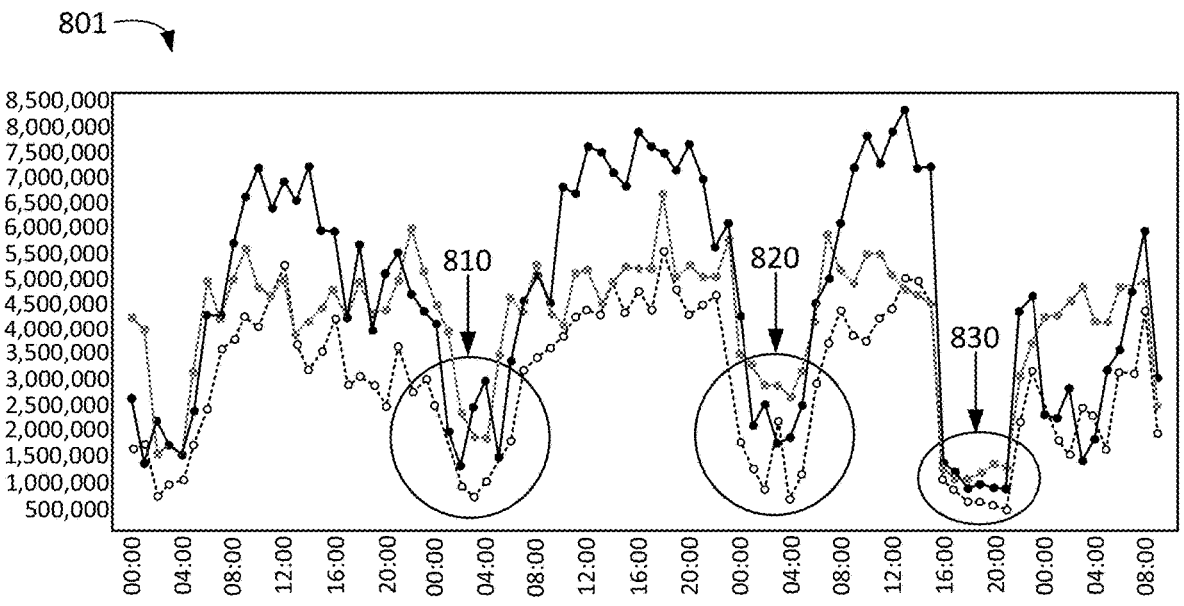
FIGS. 8A and 8B illustrate exemplary data used for anomaly detection according to an implementation described herein.
Figure 8B:
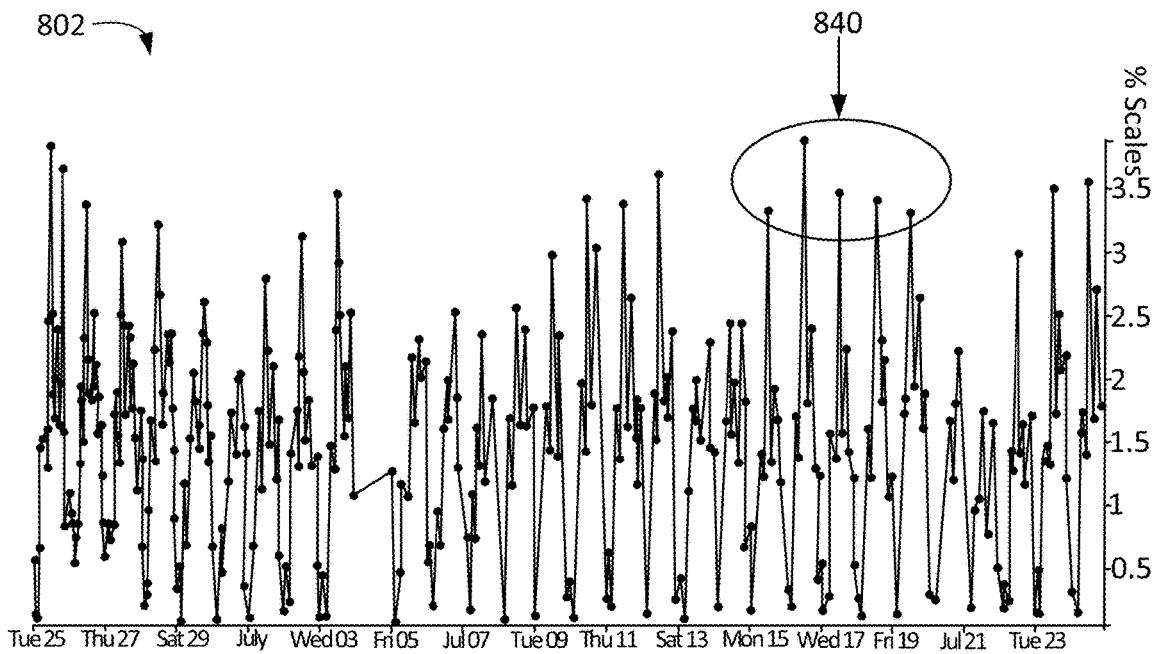

FIGS. 8A and 8B illustrate exemplary data used for anomaly detection according to an implementation described herein. FIG. 8A illustrates a plot 801 of values for throughput for three transceivers for three different sectors of base station 125. Plot 801 may include regions 810, 820, and 830 that may be indicative of an anomaly. However, anomaly detection system 150 may determine that only region 830 corresponds to an anomaly. FIG. 8B illustrates a plot 802 of values for call drop percentage for base station 125. Plot 802 may include data with a high degree of randomness and visual inspection may not indicate any anomalies. However, anomaly detection system 150 my determine that region 840 corresponds to an anomaly.

Figure 9:
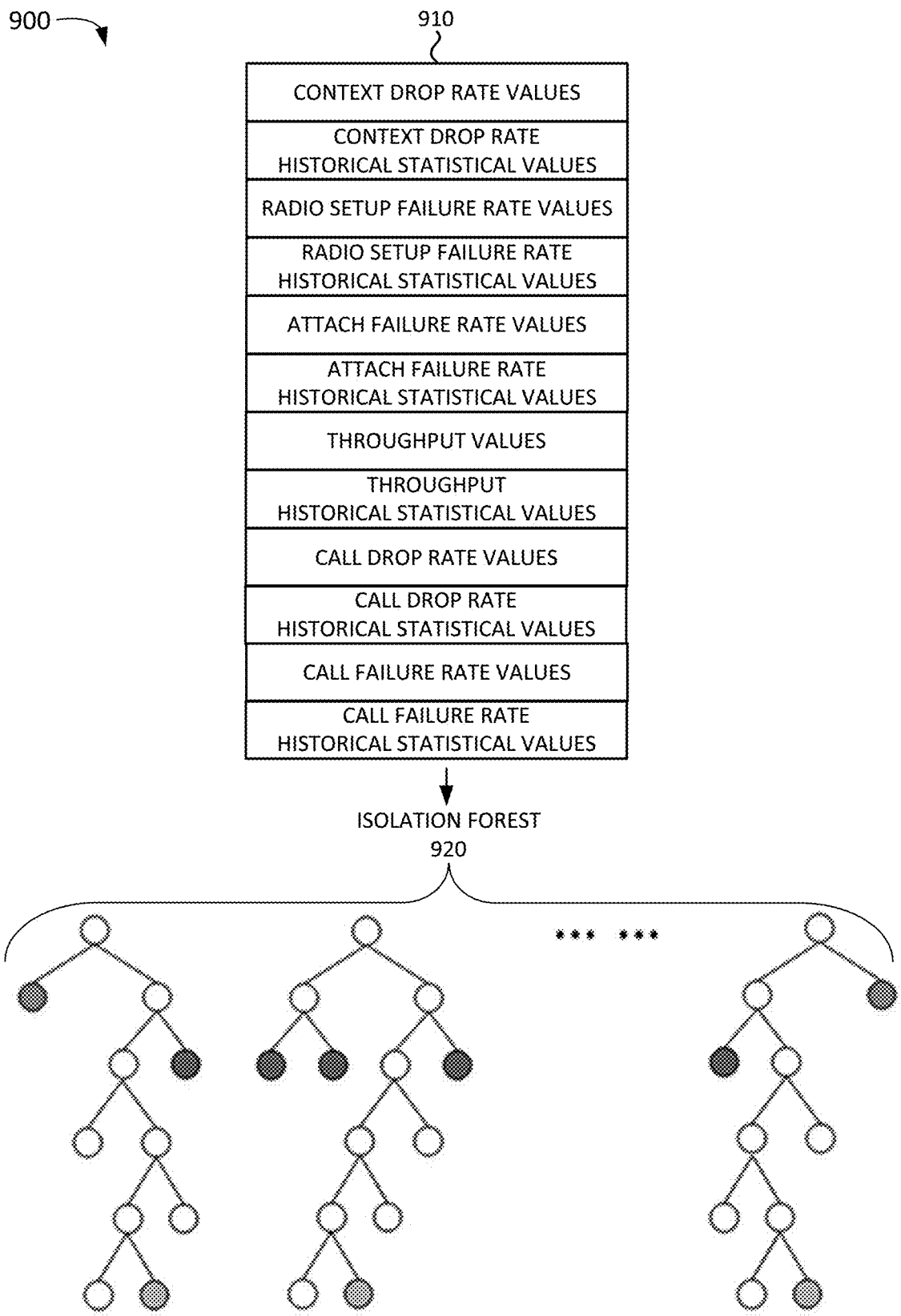
FIG. 9 illustrates an exemplary input into an anomaly detection model according to an implementation described herein.

FIG. 9 illustrates a diagram 900 of an exemplary input into an anomaly detection model according to an implementation described herein. As shown in FIG. 9, input vectors 910 may include a set of KPI values and corresponding historical statistical values associated with the KPI values for base station 125. Input vectors 910 may include context drop values (e.g., a drop of a bearer or communication tunnel) and context drop rate historical statistical values, radio setup failure rate values and radio setup failure rate historical statistical values, attach failure rate values and attach failure rate historical statistical values, throughput values and throughput historical statistical values, and call drop rate values and call drop rate historical statistical values, and call failure rate values and call failure rate historical statistical values. As an example, each input vector 910 of a set of input vectors 910 may include a set of values for a time series data for a single base station 125 (or a particular sector/transceiver of the single base station 125). As another example, each input vector (also labeled as 910) of a set of input vectors 910 may include a set of values for a different base station 125. The set of input vectors 910 may be provided as an input to isolation forest 920 and isolation forest 920 may output information identifying one or more potential anomalies corresponding to a particular input vectors 910 of the set of input vectors.

Figure 10:
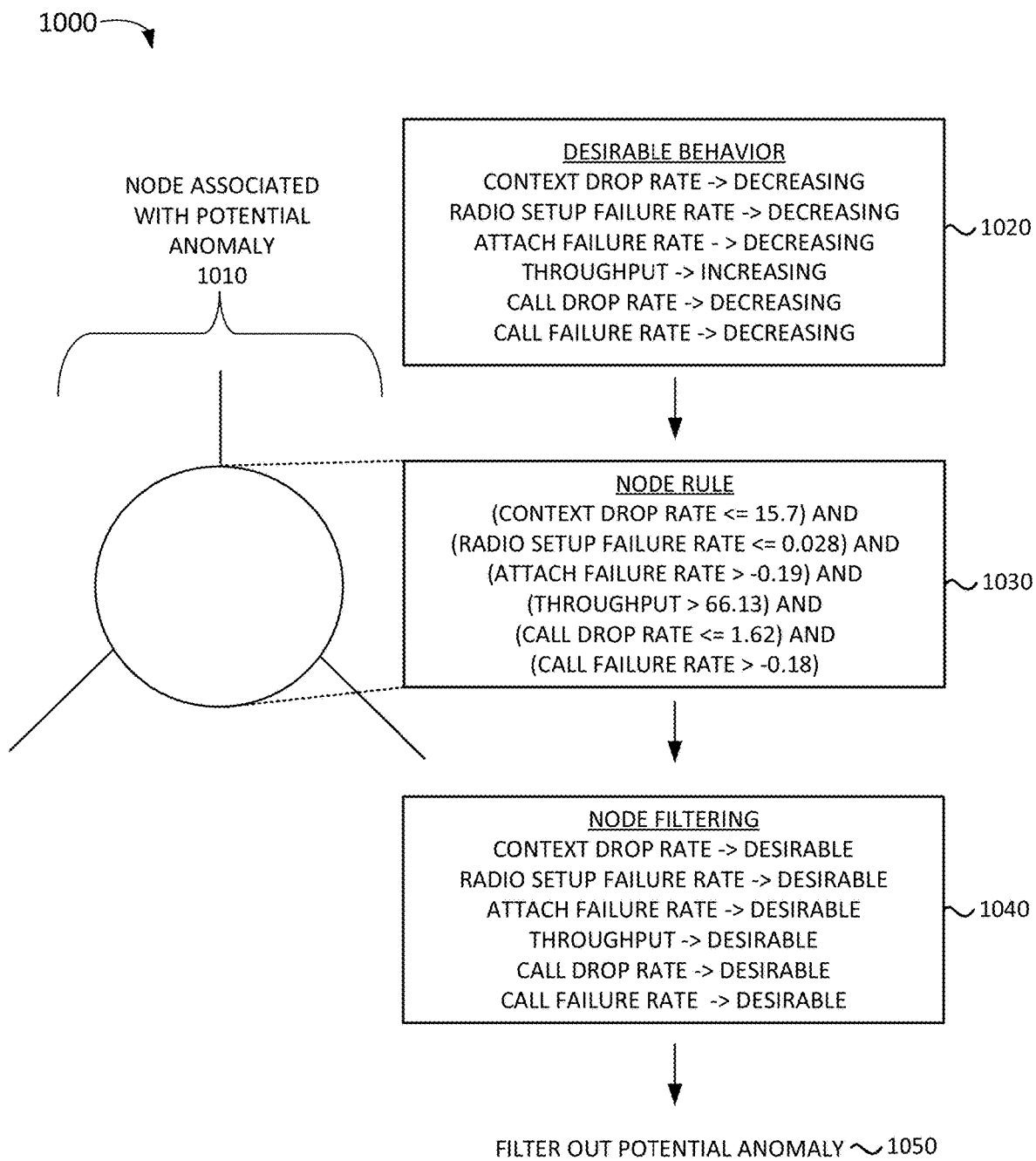
FIG. 10 illustrates an exemplary mechanism for filtering potential anomalies according to an implementation described herein.

FIG. 10 illustrates an exemplary filtering mechanism 1000 for filtering potential anomalies according to an implementation described herein. As shown in FIG. 10, filtering mechanism 1000 may examine nodes 1010 of trees in isolation forest 920. Filtering mechanism 1010 may examine each node 1010 of each tree in an isolation forest model generated for a set of input vectors 910 in a path that ends in a leaf node identified as a potential anomaly. Filtering mechanism 1000 may use a designated desirable behavior table 1020 for each KPI parameter in the data set. Designated desirable behavior table 1020 may identify a desirable behavior for each KPI parameter. For example, designated desirable behavior table 1020 may identify whether it is desirable that a KPI parameter be increasing or decreasing. In the set of KPI parameters for input vectors 910, context drop rate, radio setup failure rate, attach failure rate, call drop rate, and call failure rate may be associated with a decreasing direction as the desirable direction and throughput may be associated with an increasing direction as the desirable direction.

Filtering mechanism 1010 may examine rule 1030 at each node 1010 in the path to the leaf node of the identified potential anomaly to determine whether rule 1030 sorted input vector 910 in a desirable direction for each KPI parameter. For example, rule 1030 includes either a less than or equal sign, or a greater than sign followed by a negative value, for each KPI parameter associated with a decreasing direction as the desirable direction, namely for context drop rate, radio setup failure rate, attach failure rate, call drop rate, and call failure rate. Furthermore, rule 1030 includes either a greater than or equal sign for each KPI parameter associated with an increasing direction as the desirable direction, namely for throughput. Thus, filtering mechanism 1010 may designate rule 1030 as sorting input vector 910 in a desirable direction (item 1040). If all nodes 1010 in the path to the leaf node for sorting input vector 910 in the tree result in sorting the anomaly in the desirable direction, the potential anomaly may be filtered out as being associated with good behavior (item 1050) and may be eliminated from a list of potential anomalies.

Figure 11:
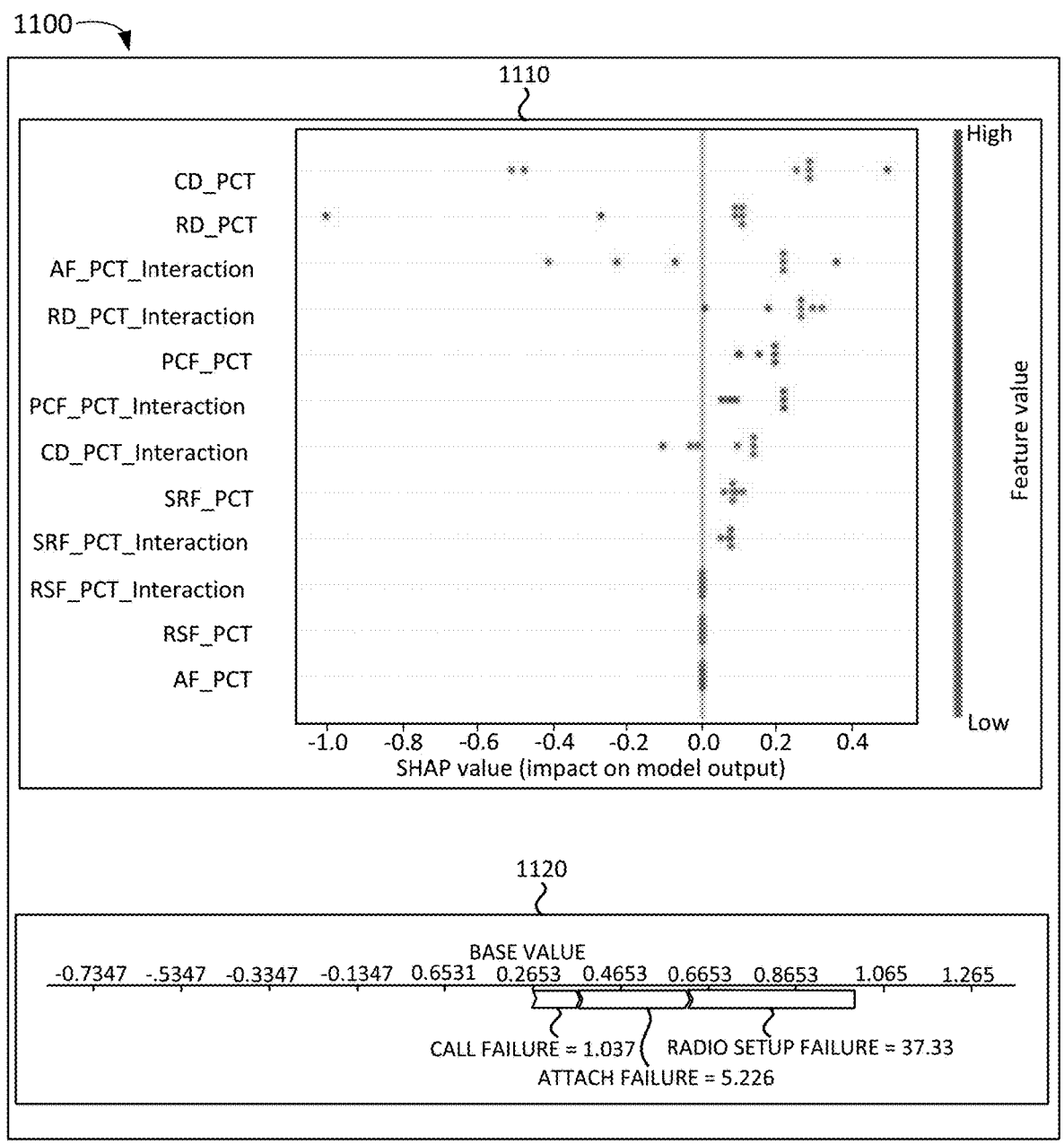
FIG. 11 illustrates exemplary plots of the determination of a root cause for an anomaly according to an implementation described herein.

FIG. 11 illustrates exemplary plots 1100 of the determination of a root cause for an anomaly according to an implementation described herein. As shown in FIG. 11, plots 1100 include a first SHAP value plot 1110 and a second SHAP value plot 1120. First SHAP value plot 1110 illustrates SHAP values computed for an anomaly based on data that includes a call drop percentage (CD_PCT) KPI parameter, a radio drop percentage (RD PCT) KPI parameter, an attach failure percentage (AF_PCT) KPI parameter, a peer communication failure percentage (PCF_PCT) KPI parameter, a Session Initiation Protocol (SIP) setup rate failure percentage (SRF_PCT) KPI parameter, and a radio setup failure percentage (RSF_PCT) KPI parameter. A higher SHAP value for a KPI parameter indicates that the KPI parameter contributed more to the anomaly. The root cause KPI parameter may be selected as the KPI parameter associated with the highest SHAP value (call drop percentage in this case). Second SHAP value plot 1120 illustrates SHAP values for KPI parameters for an anomaly based on a data set that includes a call failure KPI, an attach failure KPI, and a radio setup failure KPI. As shown in plot 1120, for this anomaly data point, the radio setup failure had the highest SHAP value and may be designated as the root cause KPI parameter associated with the anomaly.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5, 6, and 7, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions.

A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   obtaining, by a computer device, a plurality of key performance indicator (KPI) values for a plurality of KPI parameters associated with at least one network device;
   computing, by the computer device, a set of historical statistical values for the obtained plurality of KPI values;
   providing, by the computer device, the obtained plurality of KPI values and the computed set of historical statistical values to an anomaly detection model to identify a plurality of potential anomalies;
   filtering, by the computer device, the identified plurality of potential anomalies based on designated desirable behavior for a particular KPI parameter, of the plurality of KPI parameters, to identify at least one anomaly, wherein the designated desirable behavior for the particular KPI parameter identifies either an increasing direction in values of the particular KPI parameter as desirable or a decreasing direction in values of the particular KPI parameter as desirable, and wherein the filtering includes identifying potential anomalies, of the plurality of potential anomalies, as not being anomalies when identified as being associated with the designated desirable behavior;
   determining by the computer device, a root cause KPI parameter, from the plurality of KPI parameters, for the identified at least one anomaly; and
   sending, by the computer device, an alert that includes information identifying the at least one anomaly and the determined root cause KPI parameter to a network management system or a network repair system associated with the at least one network device.

2. The method of claim 1, wherein the plurality of KPI values for the plurality of KPI parameters associated with the at least one network device includes:
   a time series of values for at least one KPI parameter for a particular network device; or
   a set of values for at least one KPI parameter at a particular time for a plurality of network devices.

3. The method of claim 1, further comprising:
   computing a degree of randomness for the plurality of KPI values; and
   selecting the set of historical statistical parameters for the obtained plurality of KPI values associated with the at least one network device based on the computed degree of randomness.

4. The method of claim 3, wherein the computed degree of randomness is based on a number of data points, from the plurality of KPI values, that crossed a standard deviation value computed for the plurality of KPI values.

5. The method of claim 3, further comprising:
   determining that the computed degree of randomness is higher than a randomness threshold; and
   selecting at least one of an interquartile range, burstiness, or maximum and minimum values within a time period as the set of historical statistical parameters for the obtained plurality of KPI values associated with the at least one network device, in response to determining that the computed degree of randomness is higher than the randomness threshold.

6. The method of claim 3, further comprising:
   determining that the computed degree of randomness is lower than a randomness threshold; and
   selecting at least one of a mean, standard deviation, or historically observed maximum and minimum values as the set of historical statistical parameters for the obtained plurality of KPI values associated with the at least one network device, in response to determining that the computed degree of randomness is lower than the randomness threshold.

7. The method of claim 1, further comprising:
   selecting the anomaly detection model based on a data distribution uniformity value and a data size associated with the plurality of KPI values.

8. The method of claim 7, further comprising:
   selecting a distance-based anomaly detection model, when it is determined that the data distribution uniformity value is above a uniformity threshold and the data size is below a size threshold; or
   selecting a tree-based anomaly detection model, when it is determined that the data distribution uniformity value is below the uniformity threshold and the data size is above the size threshold.

9. The method of claim 1, further comprising:
applying a significance threshold to a particular KPI parameter, of the plurality of KPI parameters associated with at least one network device, to remove anomalies associated with the particular KPI parameter that do not meet the significance threshold.

10. The method of claim 1, wherein filtering the identified plurality of potential anomalies based on a designated desirable behavior for a particular KPI parameter, of the plurality of KPI parameters, to identify at least one anomaly includes:
designating a desirable direction of change in values for the particular KPI parameter as either the increasing direction in values of the particular KPI parameter or the decreasing direction in values of the particular KPI parameter;
determining that a particular KPI value, of the plurality of KPI values, was classified by the anomaly detection model based on the designated desirable direction; and
filtering the particular KPI value out as not an anomaly, based on determining that the particular KPI value, of the plurality of KPI values, was classified by the anomaly detection model based on the designated desirable direction.

11. The method of claim 1, wherein the anomaly detection model includes an isolation forest model, and wherein filtering the identified plurality of potential anomalies based on a designated desirable behavior for a particular KPI parameter, of the plurality of KPI parameters, to identify at least one anomaly includes:
designating an increasing trend in the particular KPI parameter as an undesirable direction of change;
determining that thresholds for each of the plurality of KPI parameters included in a node of the isolation forest model are less than a mean value; and
filtering the particular KPI value out as not an anomaly, based on determining that the thresholds for each of the plurality of KPI parameters included in the node of the isolation forest model are less than the mean value.

12. The method of claim 1, wherein determining the root cause KPI parameter for the identified at least one anomaly includes:
using a distance-based anomaly detection model as the anomaly detection model to identify the at least one anomaly; and
using a tree-based anomaly detection model to identify a root cause KPI parameter using the identified at least one anomaly as an input.

13. The method of claim 1, wherein determining the root cause KPI parameter for the identified at least one anomaly includes:
calculating at least one Shapley Additive Explanations (SHAP) value for the identified at least one anomaly.

14. A computer device comprising:
a memory storing instructions; and
a processor configured to execute the instructions to:
obtain a plurality of key performance indicator (KPI) values for a plurality of KPI parameters associated with at least one network device;
compute a set of historical statistical values for the obtained plurality of KPI values associated with the at least one network device;
provide the obtained plurality of KPI values and the computed set of historical statistical values to an anomaly detection model to identify a plurality of potential anomalies;
filter the identified plurality of potential anomalies based on a designated desirable behavior for a particular KPI parameter, of the plurality of KPI parameters, to identify at least one anomaly, wherein the designated desirable behavior for the particular KPI parameter identifies either an increasing direction in values of the particular KPI parameter as desirable or a decreasing direction in values of the particular KPI parameter as desirable, and wherein the filtering includes identifying potential anomalies, of the plurality of potential anomalies, as not being anomalies when identified as being associated with the designated desirable behavior;
determine a root cause KPI parameter, from the plurality of KPI parameters, for the identified at least one anomaly; and
send an alert that includes information identifying the at least one anomaly and the determined root cause KPI parameter to a network management system or a network repair system associated with the at least one network device.

15. The computer device of claim 14, wherein the processor is further configured to:
compute a degree of randomness for the plurality of KPI values; and
wherein the processor is further configured to select the set of historical statistical parameters for the obtained plurality of KPI values associated with the network device based on the computed degree of randomness.

16. The computer device of claim 14, wherein the processor is further configured to:
select the anomaly detection model based on a data distribution uniformity value and a data size associated with the plurality of KPI values;
select a distance-based anomaly detection model, when it is determined that the data distribution uniformity value is above a uniformity threshold and the data size is below a size threshold; and
select a tree-based anomaly detection model, when it is determined that the data distribution uniformity value is below the uniformity threshold and the data size is above the size threshold.

17. The computer device of claim 14, wherein, when filtering the identified plurality of potential anomalies based on designated desirable behavior for a particular KPI parameter, of the plurality of KPI parameters, to identify at least one anomaly, the processor is further configured to:
designate a desirable direction of change in values for the particular KPI parameter as either the increasing direction in values of the particular KPI parameter or the decreasing direction in values of the particular KPI parameter;
determine that a particular KPI value, of the plurality of KPI values, was classified by the anomaly detection model based on the designated desirable direction; and
filter the particular KPI value out as not an anomaly, based on determining that the particular KPI value, of the plurality of KPI values, was classified by the anomaly detection model based on the designated desirable direction.

18. A non-transitory computer-readable memory device storing instructions executable by a processor, the non-transitory computer-readable memory device comprising:
one or more instructions to obtain a plurality of key performance indicator (KPI) values for a plurality of KPI parameters associated with at least one network device;

one or more instructions to compute a set of historical statistical values for the obtained plurality of KPI values associated with the at least one network device;

one or more instructions to provide the obtained plurality of KPI values and the computed set of historical statistical values to an anomaly detection model to identify a plurality of potential anomalies;

one or more instructions to filter the identified plurality of potential anomalies based on a designated desirable behavior for a particular KPI parameter, of the plurality of KPI parameters, to identify at least one anomaly, wherein the designated desirable behavior for the particular KPI parameter identifies either an increasing direction in values of the particular KPI parameter as desirable or a decreasing direction in values of the particular KPI parameter as desirable, and wherein the filtering includes identifying potential anomalies, of the plurality of potential anomalies, as not being anomalies when identified as being associated with the designated desirable behavior;

one or more instructions to determine a root cause KPI parameter, from the plurality of KPI parameters, for the identified at least one anomaly; and one or more instructions to send an alert that includes information identifying the at least one anomaly and the determined root cause KPI parameter to a network management system or a network repair system associated with the at least one network device.

19. The non-transitory computer-readable memory device of claim 18, wherein the one or more instructions to determine the root cause KPI parameter for the identified at least one anomaly include:

one or more instructions to use a distance-based anomaly detection model as the anomaly detection model to identify the at least one anomaly; and one or more instructions to use a tree-based anomaly detection model to identify a root cause KPI parameter using the identified at least one anomaly as an input.

20. The non-transitory computer-readable memory device of claim 18, wherein the one or more instructions to determine the root cause KPI parameter for the identified at least one anomaly include:

one or more instructions to calculate at least one Shapley Additive Explanations (SNAP) value for the identified at least one anomaly.

* * * * *